(12) United States Patent
Hammerum et al.

(10) Patent No.: US 10,465,659 B2
(45) Date of Patent: Nov. 5, 2019

(54) FAST REACTING CONTROL SYSTEM FOR WIND TURBINE

(71) Applicant: VESTAS WIND SYSTEMS A/S, Aarhus N (DK)

(72) Inventors: Keld Hammerum, Hadsten (DK); Martin Ansbjerg Kjær, Harlev J (DK); Jesper Sandberg Thomsen, Hadsten (DK); Eik Herbsleb, Odder (DE); Tobias Gybel Hovgaard, Ry (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 29 days.

(21) Appl. No.: 15/759,150

(22) PCT Filed: Sep. 27, 2016

(86) PCT No.: PCT/DK2016/050309
§ 371 (c)(1),
(2) Date: Mar. 9, 2018

(87) PCT Pub. No.: WO2017/054825
PCT Pub. Date: Apr. 6, 2017

(65) Prior Publication Data
US 2018/0283354 A1    Oct. 4, 2018

(30) Foreign Application Priority Data

Sep. 28, 2015 (DK) .................... 2015 70612

(51) Int. Cl.
*F03D 7/04* (2006.01)
*G05B 19/042* (2006.01)
(Continued)

(52) U.S. Cl.
CPC ............. *F03D 7/044* (2013.01); *F03D 7/043* (2013.01); *F03D 7/045* (2013.01); *F03D 7/047* (2013.01);
(Continued)

(58) Field of Classification Search
USPC ........................................... 700/287
See application file for complete search history.

(56) References Cited

U.S. PATENT DOCUMENTS

| 5,295,072 A | 3/1994 | Stevens, Jr. et al. |
| 2011/0229300 A1 | 9/2011 | Kanev et al. |

(Continued)

FOREIGN PATENT DOCUMENTS

| CN | 101892951 A | 11/2010 |
| CN | 102214930 A | 11/2010 |

(Continued)

OTHER PUBLICATIONS

Danish Patent and Trademark Office Examination Report for Application No. PA 2015 70612 dated May 9, 2016.
(Continued)

*Primary Examiner* — Mohammad Ali
*Assistant Examiner* — Sheela Rao
(74) *Attorney, Agent, or Firm* — Patterson + Sheridan, LLP

(57) ABSTRACT

The present disclosure relates to a control system for a wind turbine comprising more controllers and where at least some of the controllers operate at different sample frequencies. The control system comprises at least two controller units, a first controller (10) for determining an operational value (OV) of a sub-system and a second controller (20) for the sub-system. The second controller operates at a higher sample frequency than the first controller. It is disclosed that a faster reaction to a received demand value (V1), received for controlling the sub-system, can be obtained by setting the operational value (OV) of the sub-system as the sum of an internal operational value (V5) and a difference value (V4).

12 Claims, 2 Drawing Sheets

(51) Int. Cl.
    *G05B 21/02*     (2006.01)
    *G05B 13/04*     (2006.01)

(52) U.S. Cl.
    CPC ......... *G05B 13/04* (2013.01); *G05B 19/0421* (2013.01); *G05B 21/02* (2013.01); *G05B 2219/2619* (2013.01); *Y02E 10/723* (2013.01)

(56) References Cited

U.S. PATENT DOCUMENTS

| | | | | |
|---|---|---|---|---|
| 2012/0004781 A1* | 1/2012 | Santos | ............... | F03D 7/0284 |
| | | | | 700/287 |
| 2012/0292943 A1* | 11/2012 | Danev | ............... | B62D 35/005 |
| | | | | 296/180.1 |
| 2014/0371916 A1 | 12/2014 | Nagaoka et al. | | |

FOREIGN PATENT DOCUMENTS

| | | |
|---|---|---|
| CN | 102062051 A | 5/2011 |
| CN | 102102625 A | 6/2011 |
| EP | 2375064 A2 | 10/2011 |
| EP | 2584194 A2 | 4/2013 |
| EP | 2741153 A1 | 6/2014 |
| KR | 101298627 B1 | 8/2013 |
| WO | 2006069569 A1 | 7/2006 |
| WO | 2017054825 A1 | 4/2017 |

OTHER PUBLICATIONS

Patent Cooperation Treaty International Search Report for Application No. PCT/DK2016/050309 dated Nov. 30, 2016.
PCT Written Opinion of the International Searching Authority for Application No. PCT/DK2016/050309.

* cited by examiner

FAST REACTING CONTROL SYSTEM FOR WIND TURBINE

FIELD OF THE INVENTION

The present invention relates to control of a wind turbine, and in particular it relates to control using more controllers where at least some of the controllers operate at different sample frequencies.

BACKGROUND OF THE INVENTION

Modern wind turbines are controlled and regulated continuously with the purpose of ensuring optimal power extraction from the wind under the current wind, and weather, while at the same time ensuring that the loads on the different components of the wind turbine are at any time kept within acceptable limits, and while respecting any externally set operational constraints. To accomplish this, a number of parameters are collected and monitored by the controllers in the wind turbine, such as, for instance, the current wind speed and direction, the rotational speed of the rotor, the pitch angle of each blade, the yaw angle, information on the grid system, and measured parameters (e.g. stresses or vibrations) from sensors placed e.g. on the blades, the nacelle, or on the tower. Moreover, external commands may be received via a communication network. Based on this and following some control strategy, control parameters of the turbine are determined in order to perform optimally under the given conditions.

The controller structure of a wind turbine may be implemented in a number of ways. In one type of control system, a number of controller units are used, where each controller unit is in charge of certain operational tasks, ranging from direct control of a given sub-system to set-point calculations based on a number of inputs. In such system, the nature and the complexity of the various control tasks are very diverse, and often also the computational capabilities of the controller units are quite diverse. As a consequence, certain controller unit(s) may act as bottlenecks and restrict other controllers in their ability to support fast reactions to a changing condition.

It is against this background that the invention has been devised.

SUMMARY OF THE INVENTION

It would be advantageous to achieve control of a wind turbine which is capable of supporting a fast reaction to a changed condition, even in a situation where one or more units or processes operate at a slower pace than the desired reaction time. It would also be advantageous to achieve control of a wind turbine which is capable of supporting a faster reaction rate, or response, than certain calculating units is able to deliver, while at the same time ensuring that the wind turbine operates within safe limits.

Accordingly, in a first aspect, there is provided a control system for a wind turbine, the control system comprises at least two controller units:

a first controller arranged for determining an operational value of a sub-system of the control system, the first controller being arranged to operate at a first sample frequency; and a second controller for operating the sub-system, the second controller unit being arranged to operate at a second sample frequency, the second sample frequency being higher than the first sample frequency; wherein the control system being arranged for receiving a demand value for controlling the sub-system;

wherein the control system is arranged so that the first controller and the second controller receives the demand value concurrently;

wherein the second controller determines a difference value between the demand value as received by the second controller and the demand value received via the first controller to the second controller;

wherein the first controller based on the demand value determines an internal operational value; and wherein the second controller receives the internal operational value and sets the operational value as the sum of the internal operational value and the difference value.

Embodiments of the invention provide a control system comprising at least two controllers, a slower first controller in charge of determining an operational value of a sub-system based on the demand value (e.g. an external setpoint), and a faster second controller for the sub-system. In an embodiment, the faster controller may be a controller for the electrical system, e.g. the converter controller, and the slower controller may be the general controller for the entire wind turbine (also sometimes referred to as the production controller) which controls the productions and ensures safe operation. The general controller (first controller) may operate at a slower sample rate since it may need to perform a much higher number of calculations per sample in order to ensure that the turbine operates within operational limits in accordance with the turbine's operational control strategy, or the nature of the calculations may be more complex in one controller than in other controllers. In embodiments of the present invention, the faster sample frequency of the second controller is utilized to calculate a difference value between the demand value as received by the second controller and the demand value received via the first controller to the second controller, and then add this difference value to the internal operational value, being the operational value as determined by the first controller. The difference value is the difference between the demand value as sampled with the sample frequency of the first controller, and the demand value sample with the sample frequency of the second controller. The difference value may in embodiment be obtained after pre-treatment of the demand value in the respective controllers. The operational value for the sub-system is subsequently set as the sum of the internal operational value and the difference value. In this way it is ensured that the level or stationary value of the operational value is determined by the first controller, while the transition time to reach the stationary value is determined by the second controller. Since the second controller operates at a higher sample frequency, the time to reach the stationary value is reduced. Additionally, embodiments of the invention may provide a fast reaction in that the reaction time of the initial response is reduced. In connection with grid stabilizing actions, for example, a fast initial response is beneficial.

In a further aspect, the invention also provides a wind turbine comprising the control system according to the first aspect of the invention.

In a yet further aspect the invention also provides a method for controlling a wind turbine in accordance with the first aspect of the invention. The method comprises:

receiving a demand value for controlling a sub-system of the wind turbine, the demand value being received concurrent by the first controller and by the second controller;

in the first controller:

determine an internal operational value based on the demand value;

in the second controller:

determine a difference value between the demand value as received by the second controller and the demand value received via the first controller to the second controller;

determine an operational value as the sum of the internal operational value and the difference value; and provide the operational value to the sub-system.

In yet another aspect there is provided a computer program product comprising software code adapted to control a wind turbine when executed on a data processing system. The computer program product may be provided on a computer readable storage medium comprising instructions to cause a data processing system, e.g. in the form of a controller, to carry out the instruction when loaded onto the data processing system.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
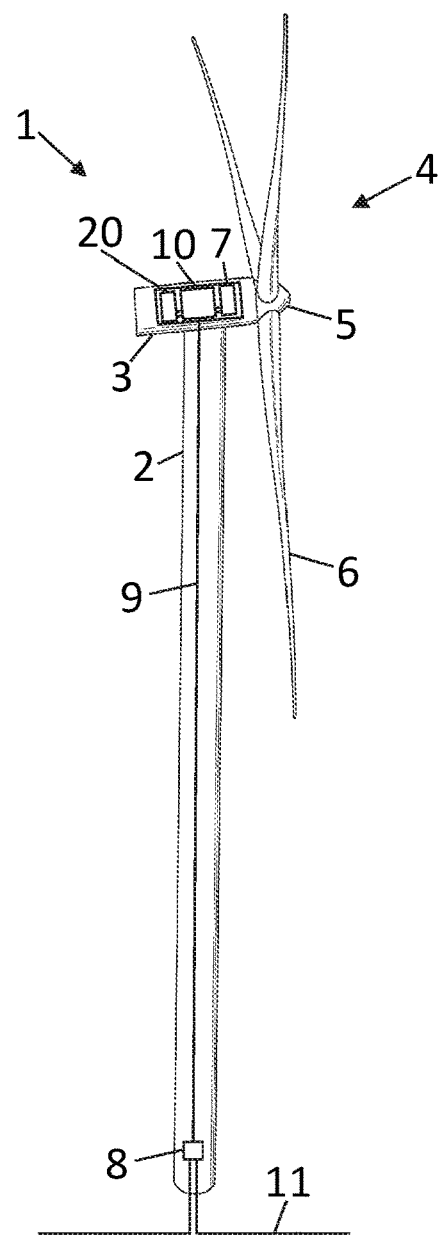
FIG. 1 illustrates, in a schematic perspective view, an example of a wind turbine.

FIG. 1 illustrates, in a schematic perspective view, an example of a wind turbine 1. The wind turbine 1 includes a tower 2, a nacelle 3 disposed at the apex of the tower, and a rotor 4 operatively coupled to a generator (not shown) housed inside the nacelle 3. In addition to the generator, the nacelle houses miscellaneous components required for converting wind energy into electrical energy and various components needed to operate, control, and optimize the performance of the wind turbine. The rotor 4 of wind turbine includes a central hub 5 and a plurality of blades 6 that project outwardly from the central hub. In the illustrated embodiment, the rotor 4 includes three blades 6, but the number may vary.

The wind turbine 1 may be included among a collection of other wind turbines belonging to a wind power plant, also referred to as a wind farm or wind park, that serves as a power generating plant connected by transmission lines with a power grid. The power grid generally consists of a network of power stations, transmission circuits, and substations coupled by a network of transmission lines that transmit the power to loads in the form of end users and other customers of electrical utilities.

The illustrated turbine schematically shows elements of a distributed control system, comprising a general controller 10 in charge of the general operation of the wind turbine within operational parameter limits in accordance with the turbine's operational control strategy. The general controller is also sometimes referred to as the production controller.

The figure further illustrates a number of sub-system controller units. The sub-system controller 20 may e.g. be an electrical controller for operating an electrical sub-system of the wind turbine, such as the converter controller or a generator controller. The sub-system controller 7 may e.g. be a rotor controller for operating the pitch system of the blades. The sub-system controller 8 may e.g. be network controller for controlling the connection of the wind turbine to a communication network. The network controller may e.g. be in charge of connecting an internal turbine communication network 9 with an external communication network 11, such that the turbine may be in communicative connectivity with a SCADA system or a power plant controller (PPC) or other external systems.

The distributed control system is shown with specific locations of the various controller units. This is to be understood as an example only. The specific layout of the controller system may be provided in any way possible.

Figure 2:
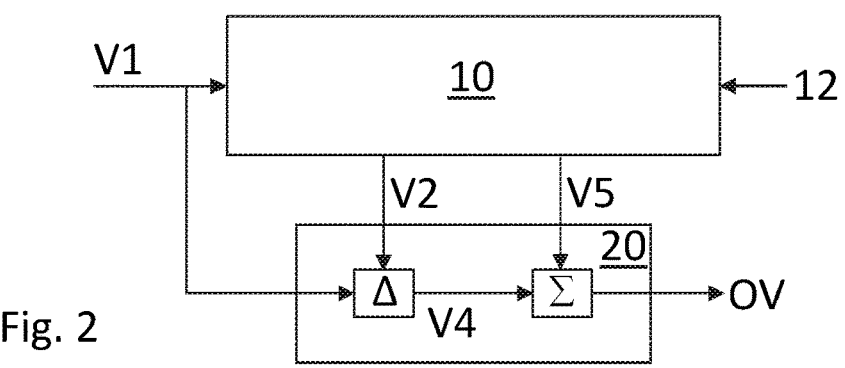
FIG. 2 schematically illustrates a first controller and a second controller in a general embodiment.

FIG. 2 schematically illustrates a general embodiment of the control system of the present invention, comprising a first controller unit 10 and a second controller unit 20.

In the illustrated embodiment, the first controller receives a demand value V1 based on which it is programmed to determine an operational value OV for the sub-system. The general controller may in the determination of the operational value use a number of inputs 12, e.g. sensor inputs, other controller values, look-up table values, online determined values, etc.

The first controller is arranged to operate at a first sample frequency and the second controller is arranged to operate at a second sample frequency, the second sample frequency being higher than the first sample frequency. As an example the first sample frequency may be a frequency between 1 Hz and 50 Hz, such as 5 Hz, 10 Hz, 25 Hz or any other specific sample frequency, and the second sample frequency may be a frequency between 75 Hz and 250 Hz, such as 100 Hz and 150 Hz or any other specific sample frequency. Different, higher or lower, sample frequencies may be used.

In embodiments the sampling frequency may relate to the number of samples per time that are calculated by the given controller unit. A sampling frequency of 10 Hz may therefore refer to that the calculated values of the given controller is updated each 100 millisecond.

As shown in FIG. 2, a demand value V1 for controlling the sub-system is received by the first controller and the second controller concurrently. The first controller operates at a lower sample frequency, so the demand value handled by the first controller is delayed as compared to the demand value handled by the second controller. This delay is utilized to determine a difference value V4 between the demand value as received by the second controller and the demand value received via the first controller to the second controller. The task of the first controller is to calculate the operational value of the sub-system. In an intermediate step, this operational value is determined as an internal operational value V5. The operational value OV is set as the sum of the internal operational value V5 and the difference value V4.

Figure 3:
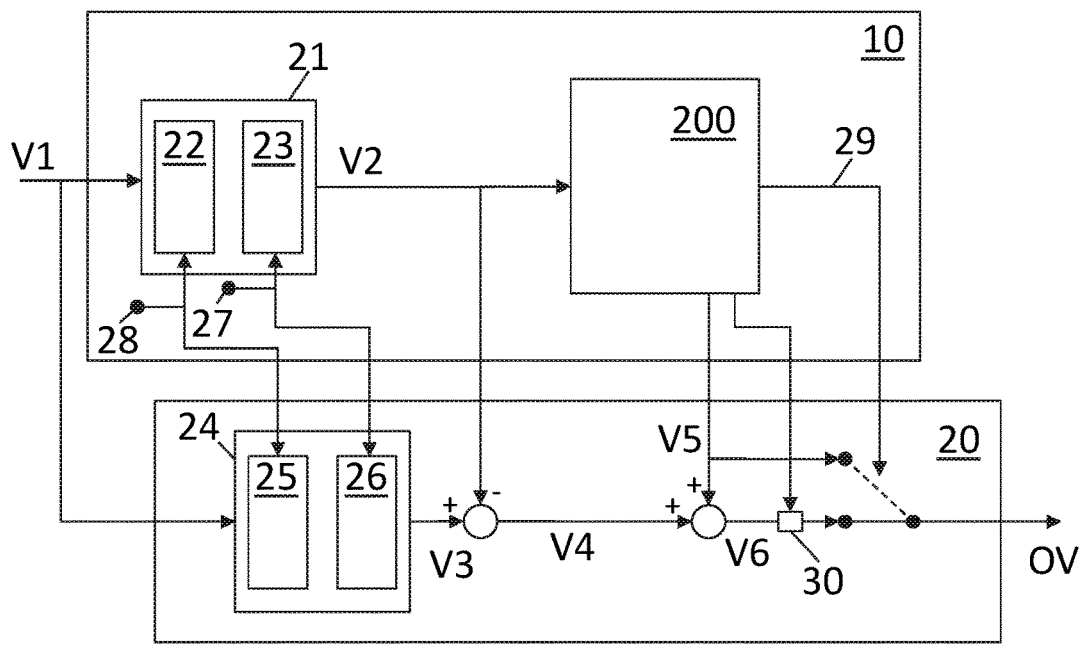
FIG. 3 illustrates elements of an embodiment of the controller system.
Figure 4:
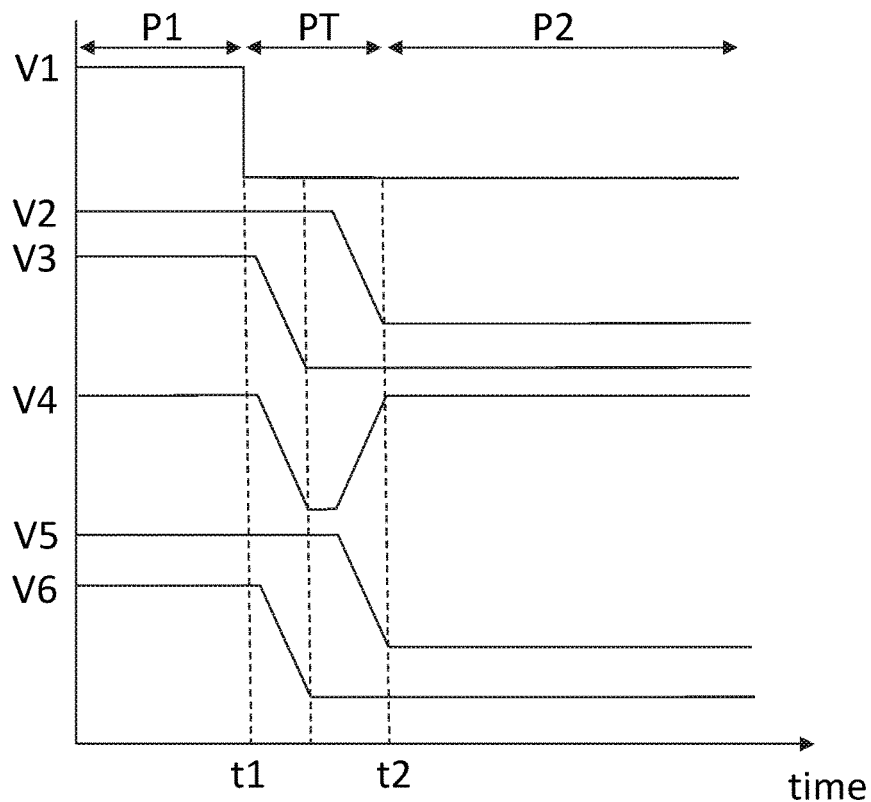
FIG. 4 illustrates example values at various positions in the embodiment illustrated in FIG. 3.

FIG. 3 and FIG. 4 illustrate elements of an exemplary embodiment of the present invention. FIG. 3 illustrates elements of the controller system and FIG. 4 illustrates example values of the control system of FIG. 3.

In an exemplary embodiment, the first controller 10 is the general wind turbine controller which receives demand value V1 in the form of an external set-point for a requested output power, and the second controller 20 is the converter controller which is in charge of provided the output power requested by the general controller. While this exemplary embodiment is used for discussion of FIGS. 3 and 4, the invention is not limited to this situation. The first and the second controller units may be any relevant controller units of the wind turbine within the scope of the present invention. With that said, selecting the two controllers as the general turbine controller and the converter controller is nevertheless an important embodiment, as the converter controller may operate at a higher sample frequency than the general controller, and therefore the general controller may be a limiting element in order to provide fast grid support. In further embodiments, the operational value may be externally provided set-points selected from the group of: a power reference, a torque reference or a speed reference, however the operational value is not limited to these examples.

In the illustrated embodiment, a new lower output power is requested at time t1 (FIG. 4). That is the demand value V1 is the output power which is requested to be lowered from a current value requested during a first period P1 to a new value requested for a second period P2. Between the two periods, a transition period PT is present. One advantage of embodiments of the present invention is that the first controller can be put in charge of ensuring that the demand value is an allowed operational point for the sub-system to ensure a safe operation, while the speed of the second controller can be utilized for making the transition period short and/or the initial response faster.

In the illustrated embodiment, the demand value V1 is first provided to a computational unit 21 for modifying the demand value. Such modification may e.g. be saturation limits 22, i.e. a limitation in absolute size of the demand value and rate limits 23, i.e. a limitation of the change of the demand value. The saturation limit may ensure that the turbine will only operate within a predefined minimum and maximum output power (or other operating values). For example if the demand value requests more power than the rated power of the turbine, the demand value is limited to the rated power value of the turbine, or if the demand value request a lower power than the minimum operating power of the wind turbine, the demand value is limited upwards to the minimum power. The rate limitation may ensure that loads during the transition to the demand value are kept below a certain load level.

Due to the saturation 22 and rate limitation 23 and possibly other modifications, the demand value is modified from V1 to V2, and as a result of the limited sample frequency the signal V2 is delayed with respect to time t1. The slope reflects the limitations imposed by the rate limiting computational unit 23.

The modified signal V2 is input into the general computing unit 200 in order to calculate an internal operational value V5, i.e. in order to calculate the set-point to be provided to the converter controller. The internal operational value V5 could be used as the actual operational value, since the internal operational value V5 is the operational value calculated by the general controller 200 to operate the converter in the light of the external power set-point and the general operational strategy. This value may be used directly by the converter controller in order to deliver the requested output power.

In embodiments of the present invention a faster reaction may be obtained than would be possible by using the internal operation value as the operational value. This is obtained by setting the operational value OV to the value V6 instead of to the value V5, that is by adding the difference value V4 to the internal operational value V5.

In the illustrated embodiment, the difference value is obtained by including a computational unit 24 also in the second controller 20 to perform modifications on the demand value to transform the demand value V1 into V3. It may be advantageous to program the computational units 21, 24 to perform same modifications on the demand value. This may be ensured by use of the same computational units which are fed by same parameter settings 27, 28. By use of same computational units 21, 24 in the two controllers, the signals V2 and V3 may easily be subtracted to provide the difference value V4. In other embodiments, the modifications units may be omitted or implemented in a different way in order to arrive at a difference value. In the illustrated embodiment, the only difference between the two values V2 and V3 is that the delay of V3 is shorter than the delay of V2 due to the higher sampling frequency.

The first controller may in embodiments be implemented using different control algorithm types. In one embodiment, the first controller is implemented as, or may include, a control loop feedback controller element. That is, the computational unit 200 may comprise a PI or PID controller or any other controller of such type.

In an embodiment, the first controller is implemented as a MIMO (Multiple Inputs, Multiple Outputs). In an important embodiment, the MIMO controller is implemented as a model predictive control (MPC) routine. That is, the computational unit 200 may comprise a general MIMO controller, such as an MPC controller. In further embodiments, the computational unit 200 may also combine control loop feedback controller elements with MIMO or MPC control elements.

A Model Predictive Control (MPC) controller is a multi-variable control algorithm that uses an optimization cost function J over a receding prediction horizon to calculate the optimal control moves. The optimization calculation may be computational heavy, and the first controller may for that reason operate at a lower sample frequency.

While the operational value is generally set as the sum of the internal operational value V5 and the difference signal V4, there may be situation where the operational value should be set differently, for example in a situation of a high yaw error, gusts, components with a high temperature, or other critical situations.

In one embodiment, the first controller may be further arranged to issue a limitation value 30 for providing a minimum value, a maximum value, or an allowed range of the operational value. In this situation, the second controller is arranged to ensure that the operational value does not exceed the limitation value. The wind turbine or elements of the wind turbine may be in an operational state where it is important to ensure that the turbine or elements of the turbine only operate with allowed values.

As an alternative or addition to that, in an embodiment, the first controller may further be arranged to issue an override signal 29 so that the operational value OV is set equal to the internal operational value V5. That is, the general controller decides that fast changes are not allowed. As an example, an override signal may be issued in a situation where the available power due to low wind speed is below the requested power and the wind turbine therefore do not need to sample fast, and the internal operational may be used directly to operate the subsystem.

Embodiments of the invention of a method for controlling a wind turbine are disclosed with reference to FIG. 2. In embodiments, the method may comprise receiving a demand value V1 for controlling a sub-system of the wind turbine, the demand value being received concurrent by the first controller 10 and by the second controller 20. In the first controller and an internal operational value V5 is determined based on the demand value, whereas in the second controller a difference value V4 is determined between the demand value V1 as received by the second controller and the demand value V2 received via the first controller to the second controller. The operational value OV is determined as the sum of the internal operational value and the difference value. The operational value is provided as the operational value for controlling the sub-system.

In the disclosure reference is made to value, parameter and signal. It is to be understood that in a complex system such as a wind turbine, settings, set-points, commands, instructions, etc. can be provided in many ways and forms both digitally and analogously, a skilled person will understand the proper form of providing relevant settings, set-points, commands, instructions, etc. in an operating implementation of embodiments of the present invention.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A control system for a wind turbine, the control system comprises at least two controller units:
 a first controller arranged for determining an operational value of a sub-system of the control system, the first controller being arranged to operate at a first sample frequency; and
 a second controller for operating the sub-system, the second controller being arranged to operate at a second sample frequency, the second sample frequency being higher than the first sample frequency;
 wherein the control system being arranged for receiving a demand value for controlling the sub-system;
 wherein the control system is arranged so that the first controller and the second controller receives the demand value concurrently;
 wherein the second controller determines a difference value between the demand value as received by the second controller and the demand value received via the first controller to the second controller;
 wherein the first controller based on the demand value determines an internal operational value;
 wherein at least one of the first controller and the second controller comprises one or more computational units for modifying the demand value prior to determining the difference value;
 wherein the first controller is further arranged to issue a limitation value for providing a minimum value, a maximum value, or an allowed range of the operational value, and wherein the second controller is arranged to ensure that the operational value is bounded by the limitation value; and
 wherein the second controller receives the internal operational value and sets the operational value as a sum of the internal operational value and the difference value.

2. The control system according to claim 1, wherein the one or more computational units are programmed to perform same modifications on the demand value.

3. The control system according to claim 1, wherein the one or more computational units perform a limitation of the demand value, including one of more of a limitation in absolute size of the demand value and a limitation of a change of the demand value.

4. The control system according to claim 1, wherein the first controller comprises a controller unit being implemented as a control loop feedback controller.

5. The control system according claim 1, wherein the first controller comprises a controller unit being is implemented as model predictive controller (MPC).

6. The control system according claim 1, wherein the operational value is an externally provided set-point selected from the group of: a power reference, a torque reference or a speed reference.

7. The control system according to claim 1, wherein the first controller is further arranged to issue an override signal so that the operational value is set equal to the internal operational value.

8. The control system according claim 1, wherein the first controller is a general controller in charge of operating the wind turbine within parameter limits.

9. The control system according claim 1, wherein the second controller is an electrical controller for operating an electrical sub-system of the wind turbine.

10. A wind turbine, comprising a tower, a nacelle disposed on the tower and a control system; the control system comprising:
 a first controller arranged for determining an operational value of a sub-system of the control system, the first controller being arranged to operate at a first sample frequency; and
 a second controller for operating the sub-system, the second controller being arranged to operate at a second sample frequency, the second sample frequency being higher than the first sample frequency;
 wherein the control system is arranged to receive a demand value for controlling the sub-system;
 wherein the first controller and the second controller are configure to receive the demand value concurrently;
 wherein the second controller is configured to determine a difference value between the demand value as received by the second controller and the demand value received via the first controller to the second controller;
 wherein the first controller is configured to determine an internal operational value based on the demand value;
 wherein at least one of the first controller and the second controller comprises one or more computational units for modifying the demand value prior to determining the difference value;
 wherein the first controller is further arranged to issue a limitation value for providing a minimum value, a maximum value, or an allowed range of the operational value, and wherein the second controller is arranged to ensure that the operational value is bounded by the limitation value; and
 wherein the second controller is configured to receive the internal operational value and set the operational value as a sum of the internal operational value and the difference value.

11. A method for controlling a wind turbine, the wind turbine comprises a first controller arranged for determining an operational value of a sub-system, the first controller being arranged to operate at a first sample frequency, and a second controller for operating the sub-system, the second controller being arranged to operate at a second sample frequency, the second sample frequency being higher than the first sample frequency; the method comprising:

receiving a demand value for controlling a sub-system of the wind turbine, the demand value being received concurrent by the first controller and by the second controller;

in the first controller:
  determine an internal operational value based on the demand value; and
  issue a limitation value to the second controller specifying a minimum value, a maximum value, or an allowed range of the operational value;

in the second controller:
  determine a difference value between the demand value as received by the second controller and the demand value received via the first controller to the second controller;
  determine an operational value as a sum of the internal operational value and the difference value, wherein the operational value is bounded by the limitation value; and
  provide the operational value to the sub-system; and wherein at least one of the first controller and the second controller comprises one or more computational units for modifying the demand value prior to determining the difference value.

12. A computer program product comprising software code adapted to control a wind turbine, the software code, when executed by when executed on a data processing system, performs an operation for controlling a wind turbine, the wind turbine comprises a first controller arranged for determining an operational value of a sub-system, the first controller being arranged to operate at a first sample frequency, and a second controller for operating the sub-system, the second controller being arranged to operate at a second sample frequency, the second sample frequency being higher than the first sample frequency; the operation comprising:

receiving a demand value for controlling a sub-system of the wind turbine, the demand value being received concurrent by the first controller and by the second controller;

in the first controller:
  determine an internal operational value based on the demand value; and
  issue a limitation value to the second controller specifying a minimum value, a maximum value, or an allowed range of the operational value;

in the second controller:
  determine a difference value between the demand value as received by the second controller and the demand value received via the first controller to the second controller;
  determine an operational value as a sum of the internal operational value and the difference value, wherein the operational value is bounded by the limitation value; and
  provide the operational value to the sub-system; and wherein at least one of the first controller and the second controller comprises one or more computational units for modifying the demand value prior to determining the difference value.

\* \* \* \* \*